(12) United States Patent
Young et al.

(10) Patent No.: US 11,166,179 B2
(45) Date of Patent: Nov. 2, 2021

(54) METHOD AND SYSTEM FOR NETWORK SLICING BASED ON VIRTUAL ROUTING AND FORWARDING INSTANCES

(71) Applicant: Verizon Patent and Licensing Inc., Arlington, VA (US)

(72) Inventors: Kristen Sydney Young, Morris Plains, NJ (US); Mark T. Watts, Newport, RI (US); Prasad Deviprasad, Cary, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 69 days.

(21) Appl. No.: 16/599,193

(22) Filed: Oct. 11, 2019

(65) Prior Publication Data
US 2021/0112428 A1    Apr. 15, 2021

(51) Int. Cl.
| H04W 24/08 | (2009.01) |
| H04W 16/02 | (2009.01) |
| H04L 12/24 | (2006.01) |
| H04W 40/24 | (2009.01) |
| H04L 29/12 | (2006.01) |

(52) U.S. Cl.
CPC ......... *H04W 24/08* (2013.01); *H04L 41/0803* (2013.01); *H04W 16/02* (2013.01); *H04W 40/24* (2013.01); *H04L 61/6059* (2013.01); *H04L 61/6068* (2013.01)

(58) Field of Classification Search
CPC ..... H04W 24/08; H04W 16/02; H04W 40/24; H04L 41/0803; H04L 61/6059; H04L 61/6068
See application file for complete search history.

(56) References Cited

U.S. PATENT DOCUMENTS

| 2015/0281073 | A1* | 10/2015 | Kotha | ............ H04L 49/25 370/392 |
| 2019/0150081 | A1* | 5/2019 | Qiao | ............ H04W 60/00 370/329 |
| 2019/0215724 | A1* | 7/2019 | Talebi Fard | ......... H04L 43/028 |
| 2019/0261186 | A1* | 8/2019 | Xu | ............ H04W 24/02 |
| 2020/0107173 | A1* | 4/2020 | Breuer | ......... H04L 63/0876 |
| 2020/0128445 | A1* | 4/2020 | Dong | ......... H04L 45/02 |
| 2021/0112428 | A1* | 4/2021 | Young | ............ H04W 16/02 |

* cited by examiner

Primary Examiner — Mohamed A. Wasel

(57) ABSTRACT

A method, a device, and a non-transitory storage medium are described in which a network slice-to-transport domain service is provided. The service includes correlating a network slice identifier, an Internet Protocol subnet, and a virtual routing and forwarding instance pertaining to a network slice, and configuring network devices of the network slice with at least a portion of the correlated information. The service may obtain feedback information from the network devices, and evaluate performance metrics pertaining to the network slice based on the correlated information.

20 Claims, 13 Drawing Sheets

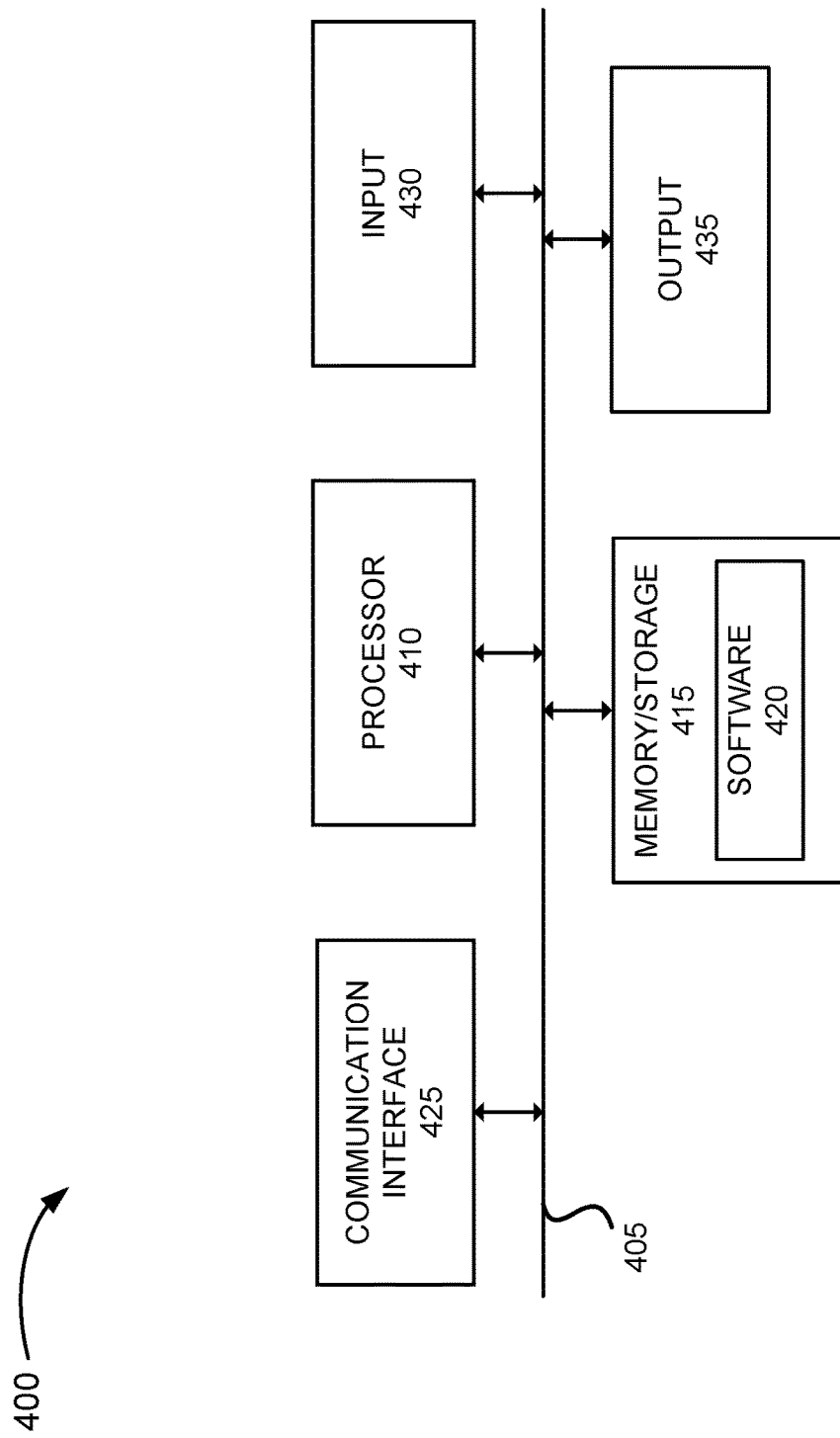

METHOD AND SYSTEM FOR NETWORK SLICING BASED ON VIRTUAL ROUTING AND FORWARDING INSTANCES

BACKGROUND

Development and design of radio access networks (RAN), core networks, and application service networks, present certain challenges from a network-side perspective and an end device perspective. Network slicing is one approach to provision network resources in support of various application services.

BRIEF DESCRIPTION OF THE DRAWINGS

FIG. 4 is a diagram illustrating exemplary components of a device that may correspond to one or more of the devices illustrated and described herein.

DETAILED DESCRIPTION OF PREFERRED EMBODIMENTS

Figure 1:
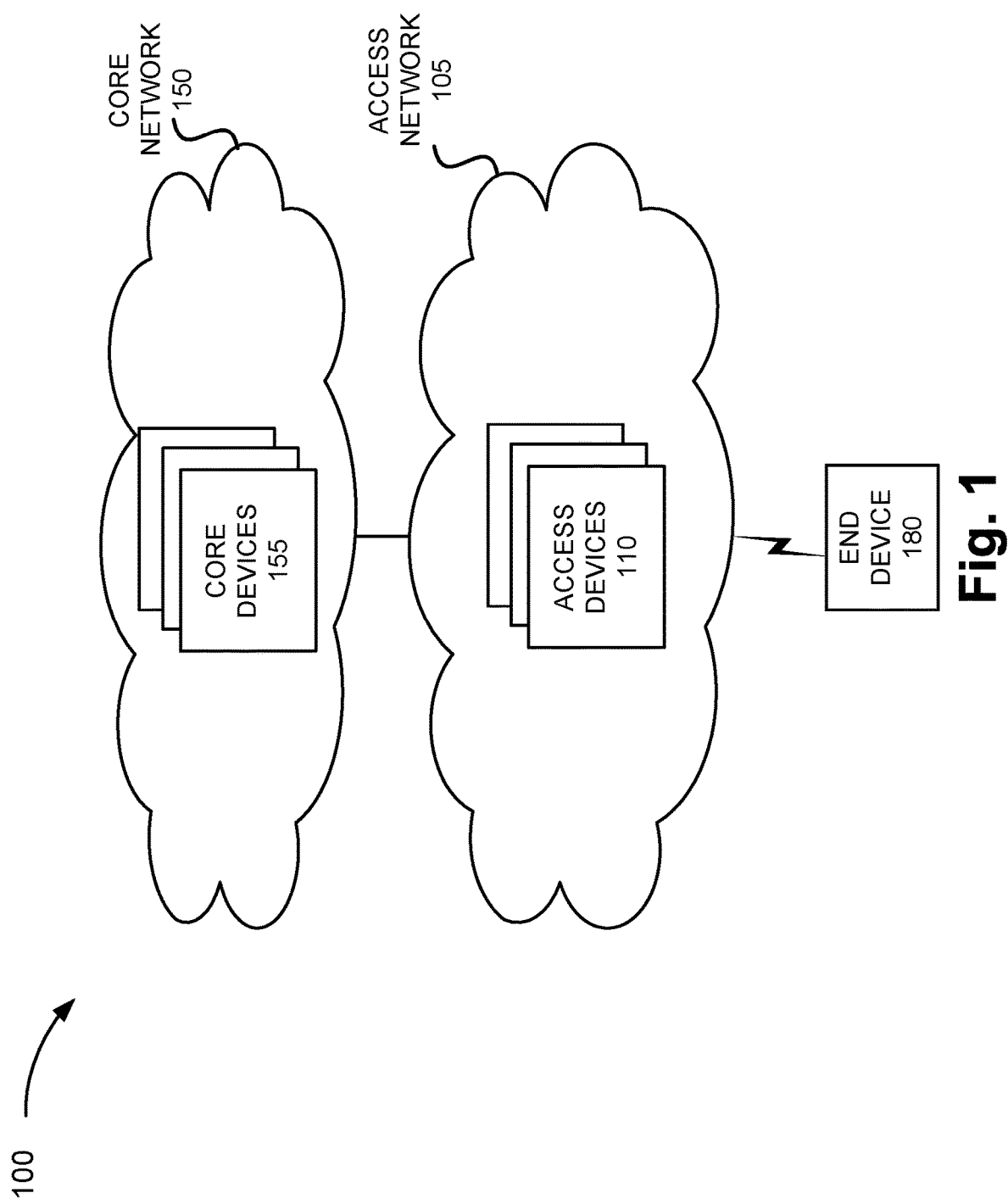
FIG. 1 is a diagram illustrating an exemplary environment in which an exemplary embodiment of a network slice-to-transport domain service may be implemented.

The following detailed description refers to the accompanying drawings. The same reference numbers in different drawings may identify the same or similar elements. Also, the following detailed description does not limit the invention.

The use of a Single Network Slice Selection Assistance Information (S-NSSAI) identifier as a network slice identifier in a radio access network (RAN), a core network, or other types of networks (e.g., an application layer network, an intermediary network (e.g., backhaul/fronthaul network, etc.), etc.) may enable end-to-end network monitoring, tuning, and service level agreement (SLA) verification. However, there is no corresponding network slice identifier in the transport domain of a network, which means that per slice monitoring, tuning, and SLA verification is not end-to-end. While there are approaches to "tag" data plane packets, such as a virtual local area network (VLAN) and a virtual extensible LAN (VXLAN), there are no mechanisms to map the number of possible S-NSSAI values (e.g., $2^{32}$ or other possible range of values) or other types of network slice identifiers to the transport domain.

According to exemplary embodiments, a network slice-to-transport domain service is described. According to an exemplary embodiment, the network slice-to-transport domain service maps network slice identifiers to the transport domain based on virtual routing and forwarding (VRF) identifiers that identify VRF instances. For example, the network slice identifier may be an S-NSSAI identifier. According to an exemplary embodiment, the S-NSSAI identifier may be mapped to an IP subnet, which is identified by an IP subnet identifier. For example, the IP subnet may be an IP version 6 (IPv6) subnet. Additionally, according to an exemplary embodiment, the IP subnet may be supported by its own VRF instance, which is identified by the VRF identifier, as described herein. In this regard, the network slice identifier, the IP subnet identifier, and the VRF identifier may be correlated, and the network slice and various network devices provisioned for the network slice may be managed.

As a result, the network slice-to-transport domain service may provide end-to-end network slice monitoring and management, including in the transport domain. Additionally, for example, the network slice-to-transport domain service may improve the use of various network resources (e.g., physical, logical, virtual, radio) in relation to network devices of a RAN, network devices of the RAN and a core network, or other types of networks (e.g., intermediary networks, application service layer networks) based on the monitoring, verifying, tuning, and/or reconfiguring of the network slice. As a result, the network slice-to-transport domain service may improve quality of service and minimize unnecessary congestion or other network failures. Additionally, the network slice-to-transport domain service may improve quality of service at the end device for similar reasons.

FIG. 1 is a diagram illustrating an exemplary environment 100 in which an exemplary embodiment of the network slice-to-transport domain service may be implemented. As illustrated, environment 100 includes an access network 105 and a core network 150. Access network 105 includes access devices 110, and core network 150 includes core devices 155. Environment 100 further includes an end device 180.

The number, type, and arrangement of networks illustrated in environment 100 are exemplary. For example, environment 100 may include an application service layer network that may be subject to the network slice-to-transport domain service. For example, the application service layer network may include a multi-access edge computing (MEC) network (also known as mobile edge computing (MEC)), an Internet Protocol Multimedia Subsystem (IMS) network, a Rich Communication Service (RCS) network, a cloud network, a packet-switched network, a data center, a fog network, the Internet, an Intranet, a private network, or other type of network that hosts an end device application or service. Additionally, or alternatively, other networks not illustrated in FIG. 1 may be included, such as a backhaul/fronthaul network or another type of intermediary network, as described herein.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the network slice-to-transport domain service may use at least one of these planes of communication. Additionally, an interface of a network device may be modified in order to support the communication (e.g., transmission and reception of messages, information elements (IE), attribute value pairs (AVPs), etc.) between network devices and the network slice-to-transport domain service, as described herein. According to various exemplary implementations, the interface may be a service-based interface or a reference point-based interface.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), a Bluetooth network, a personal area network (PAN), or another type of network (e.g., a legacy Third Generation (3G) RAN, etc.) that may be considered a network edge. Additionally, or alternatively, access network 105 may include a wired network, an optical network, or another type of network that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Additionally, or alternatively, access devices 110 may include wired and/or optical devices (e.g., modem, wired access point, optical access point, Ethernet device, etc.) that provide network access. According to an exemplary embodiment, access device 110 includes logic that provides the network slice-to-transport domain service, as described herein.

Core network 150 may include one or multiple networks of one or multiple types and technologies. According to an exemplary embodiment, core network 150 includes a complementary network of access network 105. For example, core network 150 may be implemented to include an Evolved Packet Core (EPC) of an LTE network, an LTE-A network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), a network data analytics function (NWDAF), a network exposure function (NEF), and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. According to an exemplary embodiment, core device 155 includes logic that provides the network slice-to-transport domain service, as described herein.

End device 180 includes a device that has computational and communication capabilities (e.g., wireless, wired, optical, etc.). Depending on the implementation, end device 180 may be a mobile device, a portable device, a stationary device, a device operated by a user, or a device not operated by a user. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, an autonomous device, a smart device, or other types of wireless end nodes. By way of further example, end device 180 may be implemented as a smartphone, a personal digital assistant, a tablet, a netbook, a phablet, a wearable device (e.g., a watch, glasses, etc.), customer premise equipment (e.g., a set top box, etc.), a streaming player device, an infotainment system in a vehicle, a vehicle support system, a smart television, a global positioning device, a drone, a game system, a music playing system, or other types of wireless, wired, and/or optical devices. End device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 180 may vary among end devices 180.

Figure 2:
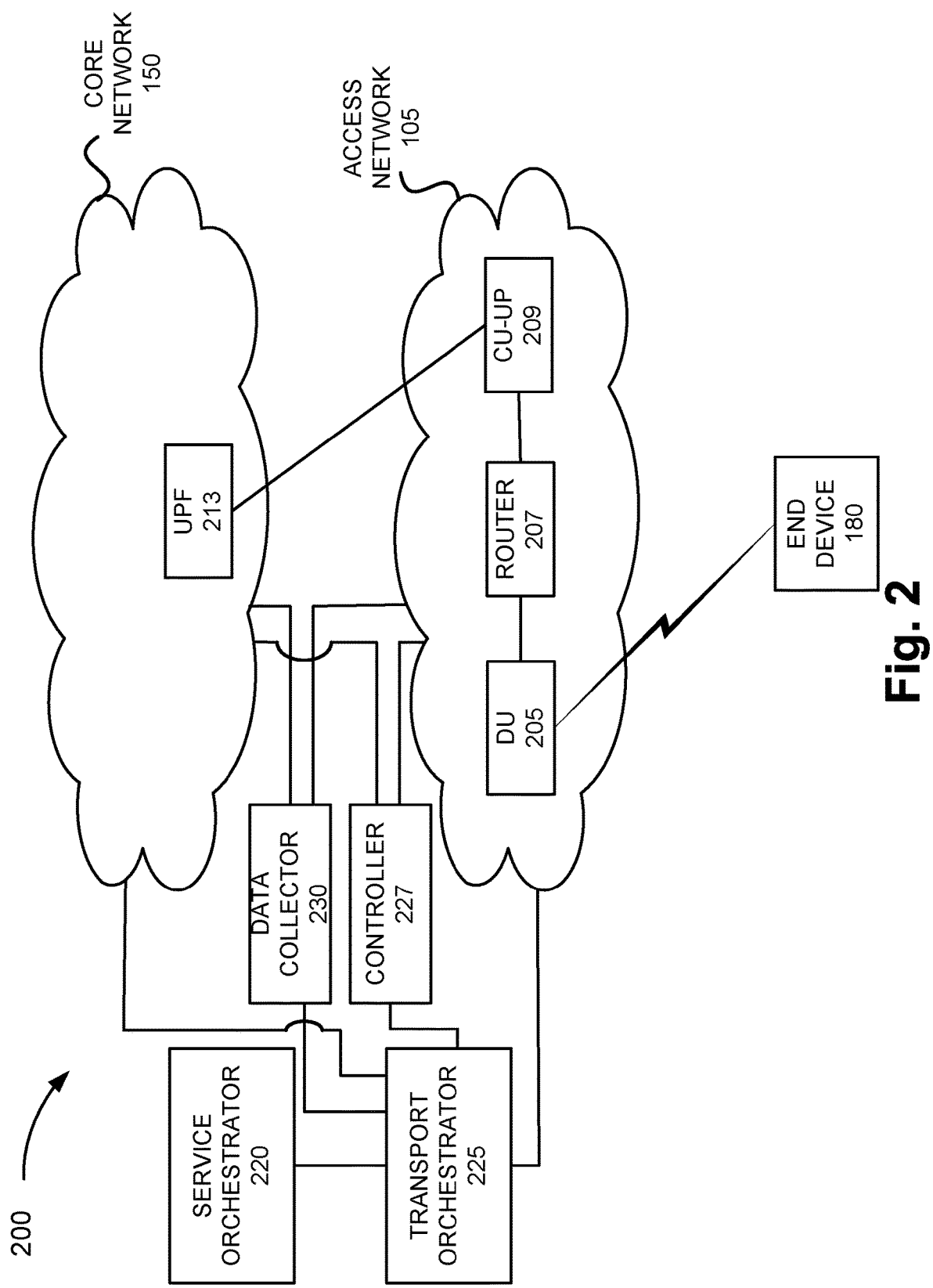
FIG. 2 is a diagrams illustrating another exemplary environment in which an exemplary embodiment of the network slice-to-transport domain service.

FIG. 2 is a diagram illustrating another exemplary environment in which an exemplary embodiment of the network slice-to-transport domain service may be implemented. As illustrated, an environment 200 includes access network 105, which includes exemplary access devices 110 of the transport domain in the user plane, such as a DU device 205, a router 207, and a CU user plane (CU-UP) device 209. Environment 200 also includes core network 150, which includes an exemplary core device 155 of the transport domain in the user plane, such as a UPF 213.

According to other exemplary embodiments, access device 110 and/or core device 155 may be a different type of transport domain network device, such as the various types of access devices 110 (e.g., eNB, gNB, eLTE eNB, etc.) and core devices 155 (e.g., SGW, PGW, etc.), as described herein. Additionally, the number and arrangement of access devices 110 and core device 155 are exemplary. The number and the arrangement of communication links illustrated in environment 200 are exemplary.

As further illustrated, environment 200 includes a service orchestrator device 220, a transport orchestrator device 225, a controller device 227, and a data collector device 230. According to other exemplary embodiments, environment 200 may include additional, fewer, and/or different network devices that provide the network slice-to-transport domain service, as described herein. Also, according to other embodiments, one or more functions and/or processes described as being performed by a particular device may be performed by a different device, or some combination of devices, which may or may not include the particular device. Additionally, a single network device, as illustrated in FIG. 2, may be implemented as multiple network devices (e.g., different functions of transport orchestrator device 225 may be implemented as multiple network devices, etc.) and/or multiple network devices may be implemented as a single network device (e.g., controller device 227 and data collector device 230 may be implemented as a single network device, etc.).

Service orchestrator device 220, transport orchestrator device 225, controller device 227, and data collector device 230 are illustrated outside of access network 105 and core network 150. However, according to other exemplary embodiments, service orchestrator device 220, transport orchestrator device 225, controller device 227, and/or data collector device 230 may be resident in access network 105, core network 155, or both. Accordingly, the number and arrangement of these devices are exemplary.

Service orchestrator device 220 includes a network device comprising logic that provides the network slice-to-transport domain service. For example, service orchestrator device 220 may provide transport orchestrator device 225 with a network slice identifier of a network slice, as described herein. According to some exemplary embodiments, the network slice may be end-to-end, such as for example, end device 180 to an application service server of an application service layer network via access network 105 and core network 150 or via access network 105. According to other exemplary embodiments, the network slice may be a segment of the end-to-end, such as for example, end device 180 to core network 150 via access network 105, or another portion of the end-to-end. According to an exemplary embodiment, the network slice identifier is an S-NSSAI identifier. According to other exemplary embodiments, the network slice identifier may be of a different format than the S-NSSAI (e.g., proprietary, non-standard, etc.). According to an exemplary embodiment, the network slice identifier may be embedded into an IPv6 address. For example, the S-NSSAI identifier may be embedded within a subnet identifier portion of the IPv6 address, within the 64 Most Significant Bits portion of the IPv6 address (e.g., within the routing prefix portion or routing prefix and subnet identifier portion of the IPv6 address), or within another portion of the IPv6 address (e.g., interface identifier portion), or some combination thereof. The IPv6 address may be used in packets of a traffic flow associated with an application service that traverse the network slice.

Service orchestrator device 220 may also comprise logic that coordinates, authorizes, releases and/or engages network resources for a network slice. Service orchestrator device 220 may obtain network slice descriptors of a network slice that satisfy network level requirements for a service request. Service orchestrator device 135 may use network resource and capability information, cost information, service request requirement information, and other types of network information for management of the network slice. According to various exemplary embodiments, service orchestrator device 220 may include various network devices, such as for example, a Network Functions Virtualization Orchestrator (NFVO), a Generic Virtual Network Function Manager (GVNFM), a Specialized Virtual Network Function Manager (SVNFM), a Virtual Infrastructure Manager (VIM), a Data Center SDN Controller, a Virtual Infrastructure Manager (VIM), a Slice Manager, Interfaces, Plug-ins, Workflows, Slice Templates, a Common Information Model (CIM), network forwarding graphs, and so forth. Service orchestrator device 220 may perform various functions such as, for example, network slice life cycle management, configuration management (e.g., policies, isolation of management), performance management (e.g., service level agreement (SLA) management, service assurance and programmability), service mapping, and so forth.

Transport orchestrator device 225 includes a network device comprising logic that provides the network slice-to-transport domain service. For example, transport orchestrator device 225 may map or correlate the network slice identifier to an IP subnet identifier and a VRF identifier, as described herein. Transport orchestrator device 225 may configure or configure via another network device (e.g., controller device 227) network devices in the transport domain of the network slice with at least a portion of the mapping or correlation. For example, the network devices in the transport domain may be configured with the network slice identifier and the IP subnet identifier, the IP subnet identifier and the VRF identifier, or some other combination of the correlated information, as described herein. Additionally, transport orchestrator device 225 may receive and analyze feedback information pertaining to the network slice. For example, the feedback information may indicate performance metric information relating to latency, packet error rate, packet drop rate, reliability, bit rates (e.g., guaranteed, maximum, minimum, average, etc.), throughput, jitter, traffic class, round trip time (RTT), and/or other quality of service, SLA, key performance indicators (KPIs), etc., parameters. Transport orchestrator device 225 is described further below.

Figure 3A:
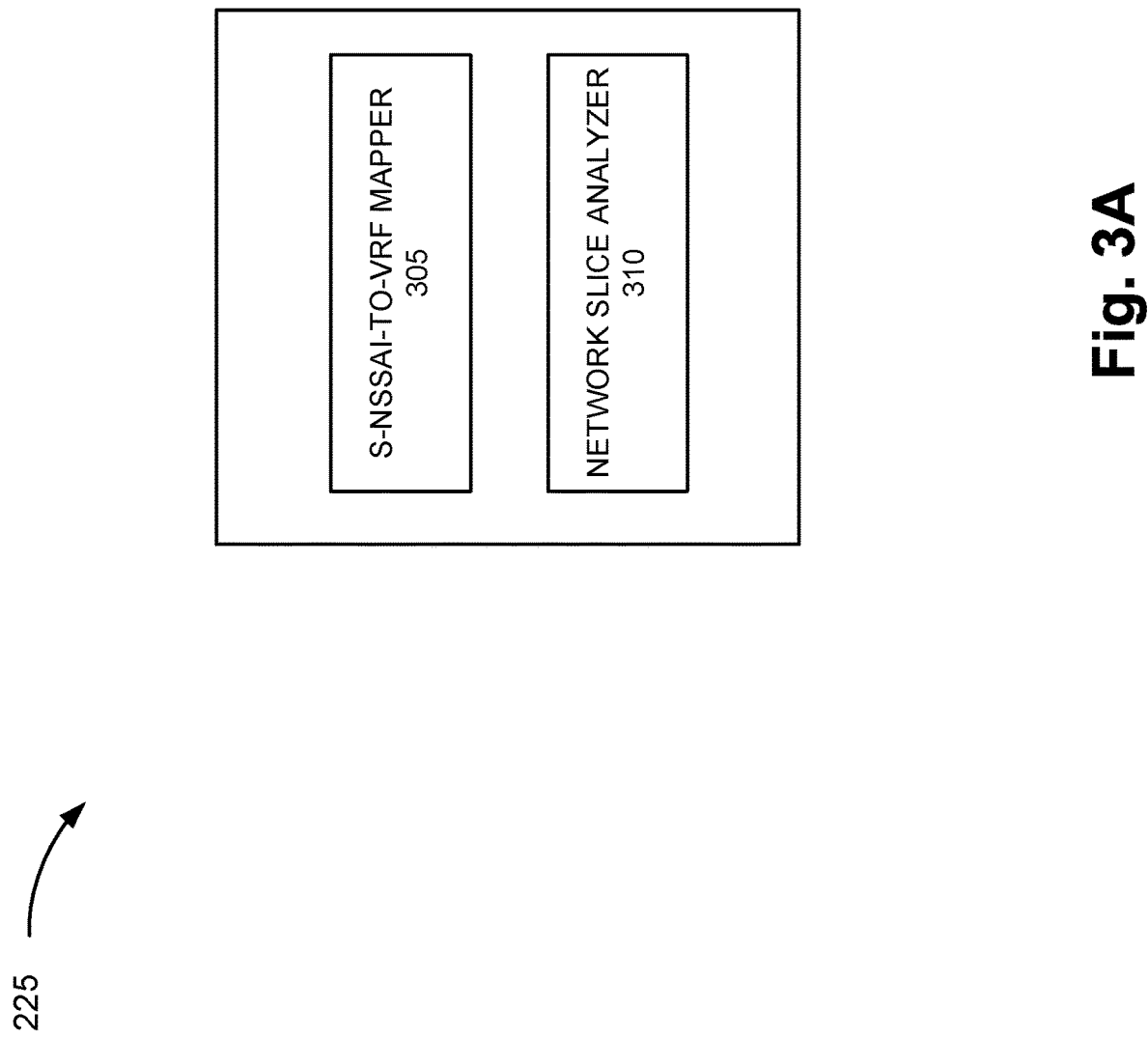
FIG. 3A is a diagram illustrating exemplary components of an exemplary embodiment of a transport orchestrator device depicted in FIG. 2.

FIG. 3A is a diagram illustrating exemplary components of an exemplary embodiment of transport orchestrator device 225. Referring to FIG. 3A, transport orchestrator device 225 may include an S-NSSAI-to-VRF mapper 305 and a network slice analyzer 255. According to other exemplary embodiments, transport orchestrator device 225 may include additional, fewer, and/or different components. For example, transport orchestrator device 225 may not include network slice analyzer 255.

Figure 3B:
FIG. 3B is a diagram illustrating exemplary components of the network slice-to-transport domain service.

S-NSSAI-to-VRF mapper 305 includes a component that assigns VRF identifiers and IP subnet identifiers to network slice identifiers. For example, referring to FIG. 3B, S-NS-SAI-to-VRF mapper 305 may store or have access to a VRF inventory 320. S-NSSAI-to-VRF mapper 305 may use VRF inventory 320 to select and assign a VRF instance and/or a VRF identifier to the network slice and the network slice identifier. VRF inventory 320 may store all VRF instances configured in a network (e.g., access network 105, core network 150, etc.). For example, a VRF instance may include a virtual routing table and a virtual forwarding table that relates to one or multiple network devices of the transport domain that may reside in one or multiple networks. The VRF instances may be assigned VRF identifiers that identify the VRF instances. VRF inventory 320 may also store other types of information, such as VRF instances and VRF identifiers that are currently assigned and/or active and VRF instances and VRF identifiers that are not currently assigned and/or active, geographic location information pertaining to the VRF instances and/or VRF identifiers, and/or other types of metadata pertaining to the VRF instances (e.g., type of transport network devices (e.g., CU-UP, eNB, etc.), endpoints of VRF instance, etc.).

S-NSSAI-to-VRF mapper 305 also assigns IP subnets to network slices. For example, referring to FIG. 3B, S-NS-SAI-to-VRF mapper 305 may store or have access to an IP subnet inventory 330. S-NSSAI-to-VRF mapper 305 may use IP subnet inventory 330 to assign IP subnets to network slices. IP subnet inventory 330 may store IP subnet identifiers pertaining to a network (e.g., access network 105, core network 150, etc.). IP subnet inventory 330 may also store other types of information, such as geographic location information pertaining to the IP subnet identifiers and/or other types of metadata. S-NSSAI-to-VRF mapper 305 may assign an IP subnet identifier, which identifies an IP subnet, to the network slice and the network slice identifier. For example, the IP subnet value may be an IPv6 subnet value.

Figure 3C:
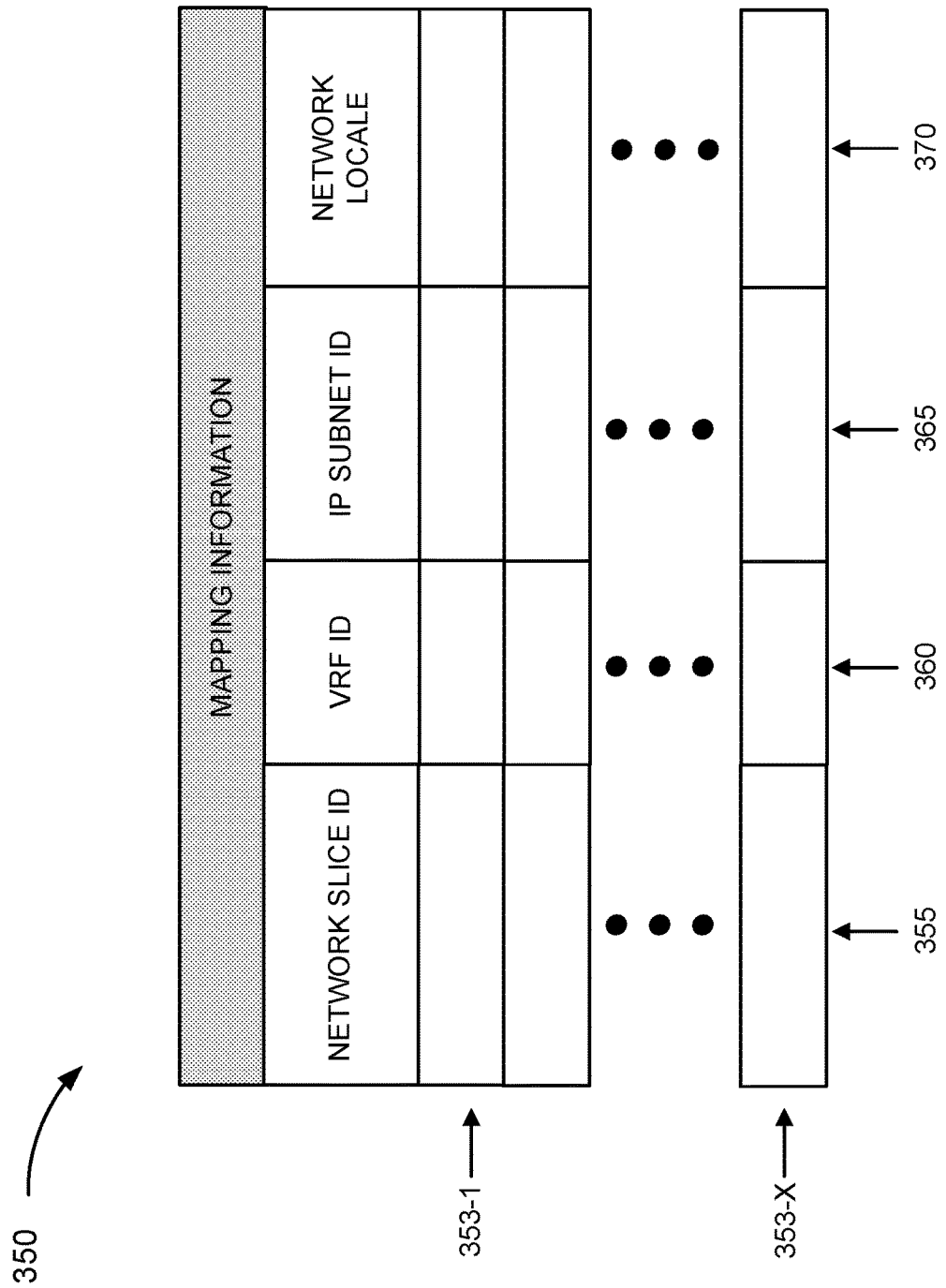
FIG. 3C is a diagram illustrating exemplary mapping information of the network slice-to-transport domain service.

S-NSSAI-to-VRF mapper 305 may store mapping information based on the assigned VRF identifiers and IP subnet identifiers. For example, FIG. 3C is a diagram that illustrates exemplary mapping information. As illustrated, a table 350 may include a network slice identifier (ID) field 355, a VRF ID field 360, an IP subnet ID field 365, and a network locale field 370. As further illustrated, table 350 includes records 353-1 through 353-X (also referred to as records 353, or individually or generally as record 353) that each includes a grouping of fields 355, 360, 365, and 370. The mapping information is illustrated in tabular form merely for the sake of description. In this regard, the mapping information may be implemented in a data structure different from a table.

Network slice ID field 355 may store a network slice identifier. For example, the network slice identifier may be an S-NSSAI identifier. The S-NSSAI may include a Slice Service Type (SST) field and a Slice Differentiator (SD) field. According to other implementations, the network slice identifier may be different from an S-NSSAI identifier (e.g., proprietary network slice identifier, a non-standard network slice identifier, etc.).

Figure 3D:
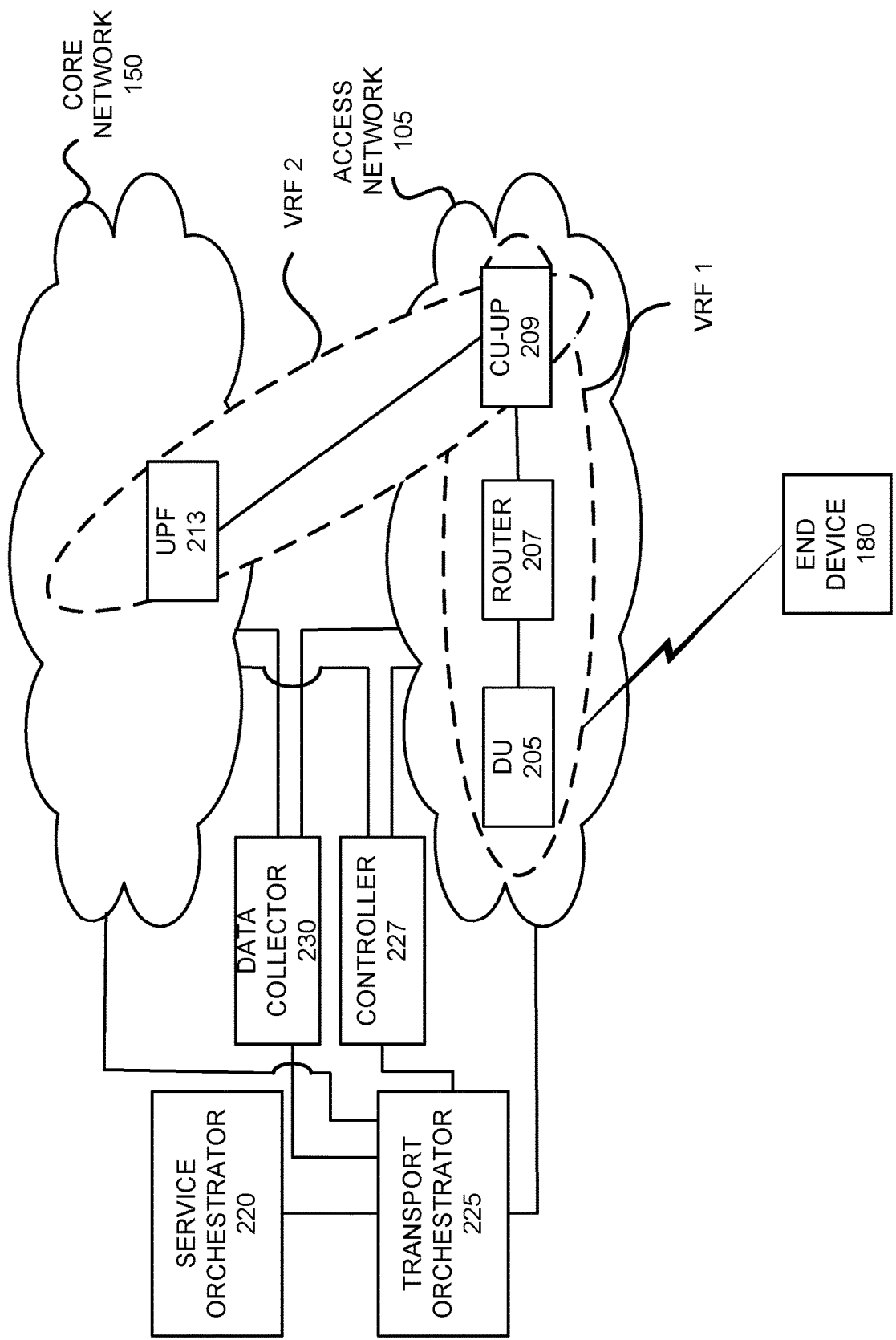
FIG. 3D is a diagram illustrating exemplary virtual routing and forwarding instances of the network slice-to-transport domain service.

VRF ID field 360 may store an identifier of the VRF instance. For example, referring to FIG. 3D, a VRF identifier may identify a VRF 1 (e.g., DU 205, router 207, CU-UP 209) of the transport domain, and another VRF identifier may identify a VRF 2 (e.g., CU-UP 209, UPF 213) of the transport domain. According to other examples, the VRF instance may be different. For example, the VRF identifier may identify the end points of a VRF or service group (e.g., DU 205 and CU-UP 209), the VRF identifier may identify an end-to-end VRF (e.g., DU 205 to an application service server (not shown), etc.), or another segment of the network slice (e.g., DU 205 to UPF 213, etc.).

IP subnet field 365 may store an IP subnet identifier. For example, the IP subnet identifier may be an IPv6 subnet identifier that identifies an IP subnet of a network (e.g., access network 105, core network 150, or another network). The IP subnet may be supported by the VRF instance within the transport network domain.

Network locale field 370 may store geographic location information that correlates to one or more of fields 355, 360, and/or 365. For example, the geographic location information may indicate a region of the network (e.g., a city, a town, or other type of geographic area).

According to other exemplary implementations, table 350 may store additional, fewer, and/or different instances of mapping information in support of the network slice-to-transport domain service, as described herein. For example, network locale field 370 may be omitted. Additionally, or alternatively, table 350 may store a field that indicates an application service or a category of the application service for which the network slice and other correlated information support.

According to various exemplary embodiments, as described herein, multiple network slices may be mapped or correlated to the same VRF instance, or a network slice and a VRF instance may be implemented as a one-to-one mapping. Additionally, or alternatively, there may be one or multiple VRF instances correlated to the same network slice or a one-to-one mapping.

Referring back to FIG. 2 and FIG. 3A, S-NSSAI-to-VRF mapper 305 may configure transport network devices of the network slice with mapping information either directly or via controller device 227, as described herein. For example, for DU 205 and CU-UP 209, the mapping information may include the network slice identifier and the IP subnet identifier. Based on this configuration, for example, DU 205 may identify the network slice identifier of an IP address included in a packet, and use the correlated IP subnet identifier for routing/forwarding packets in relation to the network slice and the network slice identifier. According to other exemplary implementations, the mapping information may include the network slice identifier and the IP subnet identifier and/or the VRF identifier. Additionally, for example, for router 207, the mapping information may include the IP subnet identifier and the VRF identifier. According to other exemplary implementations, for router 207, the mapping information may include the IP subnet identifier or the VRF identifier.

Referring back to FIG. 3A, network slice analyzer 310 includes a component that receives and analyzes feedback information from the configured transport network devices of the network slice. For example, the feedback information may include performance, quality of service, SLA requirement parameters and values. Network slice analyzer 310 may have access to the mapping information (e.g., table 350). In this way, network slice analyzer 310 may correlate a VRF identifier and/or an IP subnet identifier, which may be included in the feedback information, to the appropriate network slice. According to some exemplary embodiments, network analyzer 310 may receive feedback information from transport network device via data collector device 230. According to some exemplary embodiments, network slice analyzer 310 may generate recommendations regarding a configured network slice based on the analysis, and provide the recommendation to service orchestrator device 220.

Referring back to FIG. 2, controller device 227 may include a network device that interfaces with various network devices of access network 105, core network 150, and/or other types of networks, as described herein. For example, controller device 227 may be implemented as a domain controller, a network function manager, or other type of configuring network device. Controller 227 may obtain mapping information from transport orchestrator device 225 (e.g., S-NSSAI-to-VRF mapper 305), and configure the various network devices with the mapping information, as described herein.

Data collector device 230 may include a network device that collects and forwards feedback information from various network devices of access network 105, core network 150, and/or other types of networks, as described herein. Data collector device 230 may obtain feedback information from the various network devices, and provide the feedback information to transport orchestrator device 225 (e.g., network slice analyzer 310).

FIG. 4 is a diagram illustrating exemplary components of a device 400 that may be included in one or more of the devices described herein. For example, device 400 may correspond to components included in access devices 110, core devices 155, end device 180, service orchestrator device 220, transport orchestrator device 225, controller device 227, data collector device 230, DU, 205, router 207, CU-UP 209, and UPF 213. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphics processing units (GPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a content addressable memory (CAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory (e.g., high bandwidth memory (HBM), stacked memory, hybrid memory, etc.). Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to transport orchestrator device 225, software 420 may include an application that, when executed by processor 410, provides a function of the network slice-to-transport domain service, as described herein. Additionally, with reference to service orchestrator device 220, controller device 227, and/or data collector device 230, software 420 may include an application that, when executed by processor 410, provides a function of the network slice-to-transport domain service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces wired interfaces, and/or optical interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.), a network interface card, a port, and/or other type of communication element. Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, a microphone, an image and/or video capture device, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
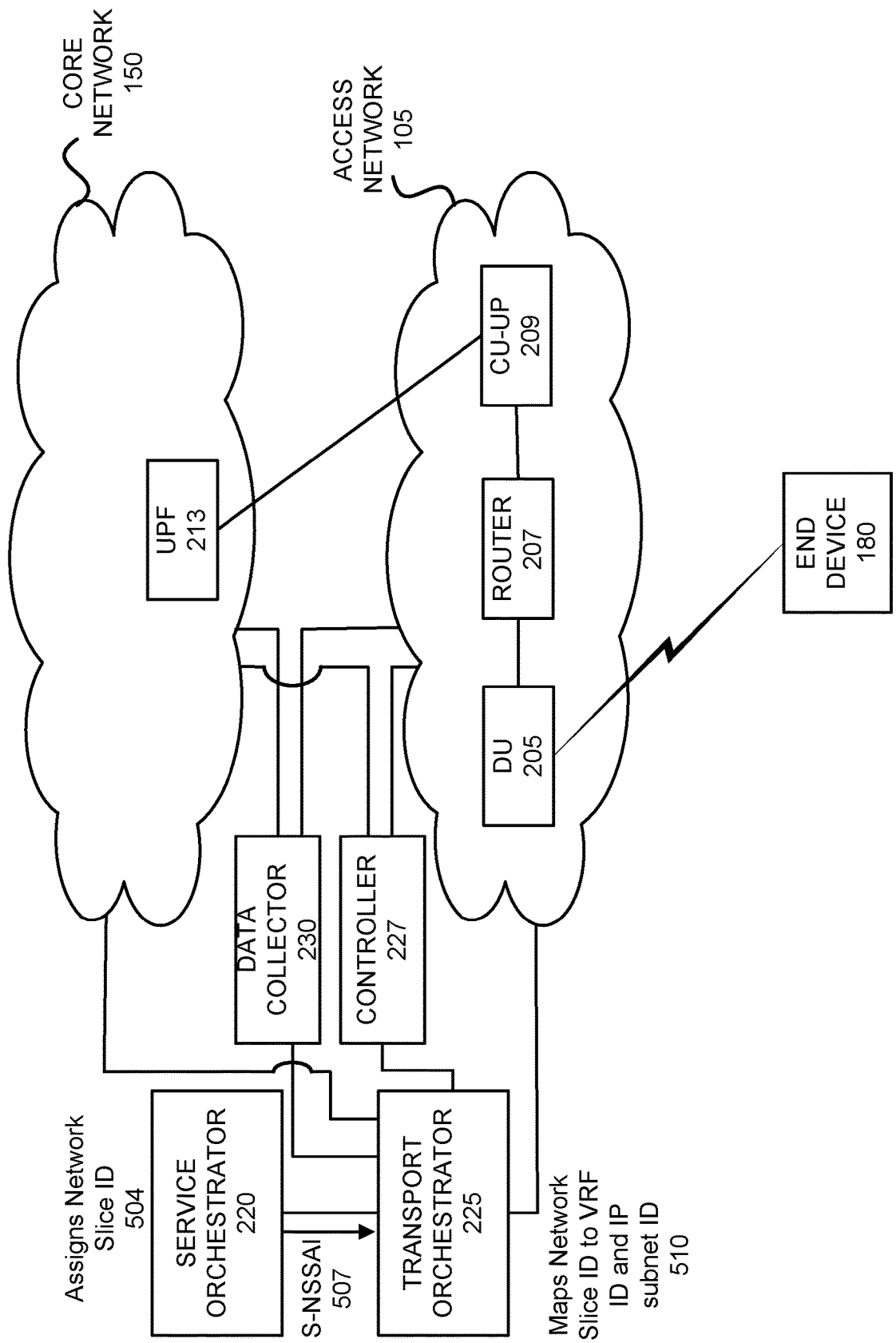
FIGS. 5A-5E are diagrams illustrating an exemplary process of an exemplary embodiment of the network slice-to-transport domain service.

FIGS. 5A-5E are diagrams illustrating an exemplary process of an exemplary embodiment of the network slice-to-transport domain service. Referring to FIG. 5A, according to an exemplary scenario, assume that end device 180 transmitted a request (e.g., as a part of an attachment procedure, a request to initiate an application service session, etc.) (not illustrated), which initiates an assignment of a network slice. As a part of the network slice provisioning, service orchestrator device 220 assigns a network slice identifier 504 that identifies the network slice. For example, the network slice identifier may be an S-NSSAI identifier 507. Service orchestrator device 220 may provide the assigned S-NSSAI identifier 507 to transport orchestrator device 225.

Figure 5B:
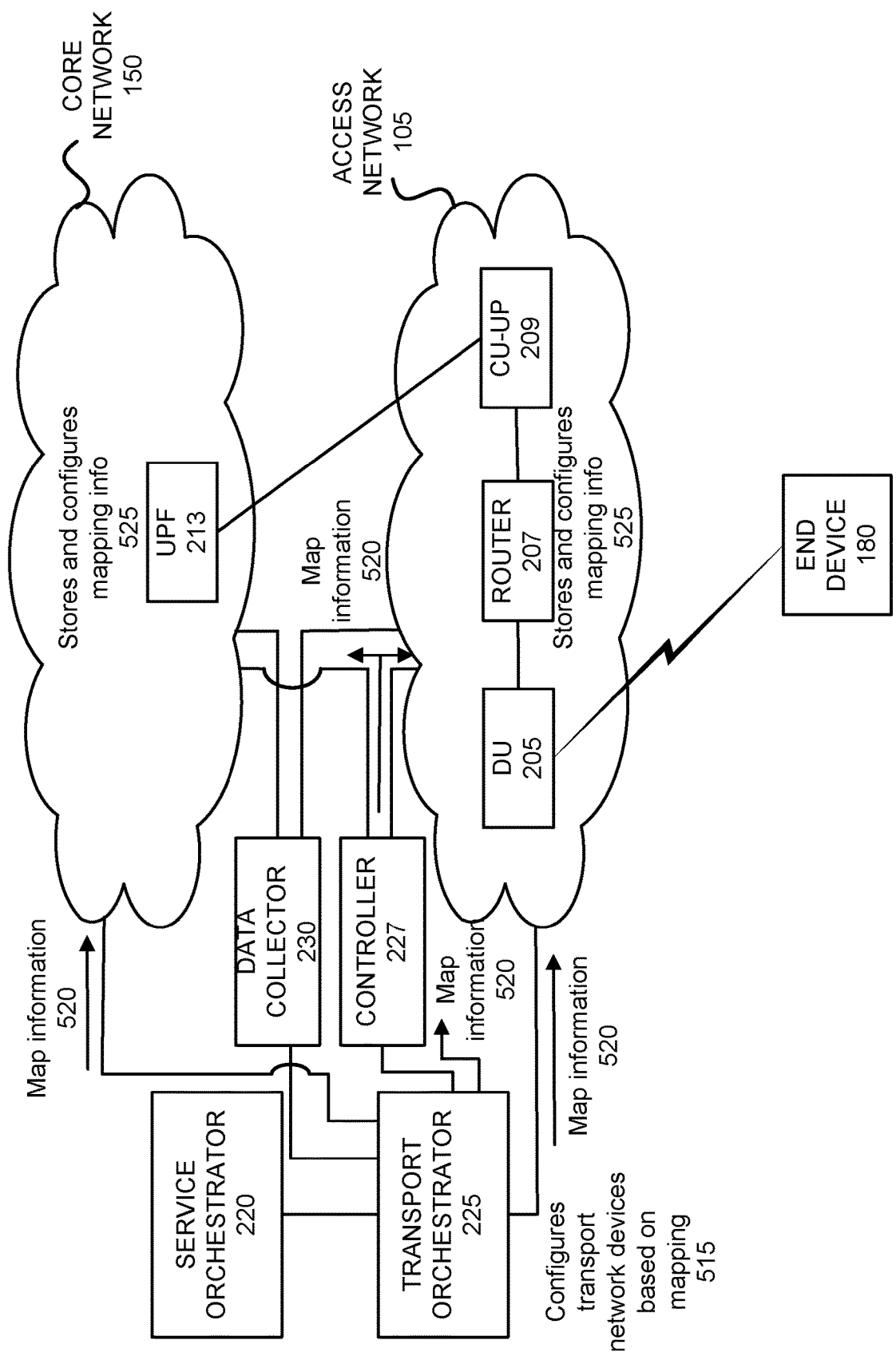

In response to receiving the network slice identifier, transport orchestrator device 225 maps the network slice identifier to a VRF identifier and an IP subnet identifier 510. For example, transport orchestrator device 225 may use VRF inventory 320 and IP subnet inventory 330 for the selection and assignment of the VRF identifier and the IP subnet relating to the network slice and network slice identifier. Transport orchestrator device 225 may store mapping information in table 350, which includes the correlation of the network slice identifier, the VRF identifier, and the IP subnet identifier. Referring to FIG. 5B, transport orchestrator device 225 may configure the transport device network devices based on the mapping information. For example, transport orchestrator device 225 may configure directly and/or via controller device 227, the mapping information with DU 205, router 207, CU-UP 209, and UPF 213. According to one example, controller device 227 may configure DU 205, CU-UP 209, and UPF 213, and transport orchestrator device 225 may directly configure router 207. According to other examples, the direct or indirect configuration of network devices may be different. DU 205, router 207, CU-UP 209, and UPF 213 may store and configure the mapping information 525.

Figure 5C:
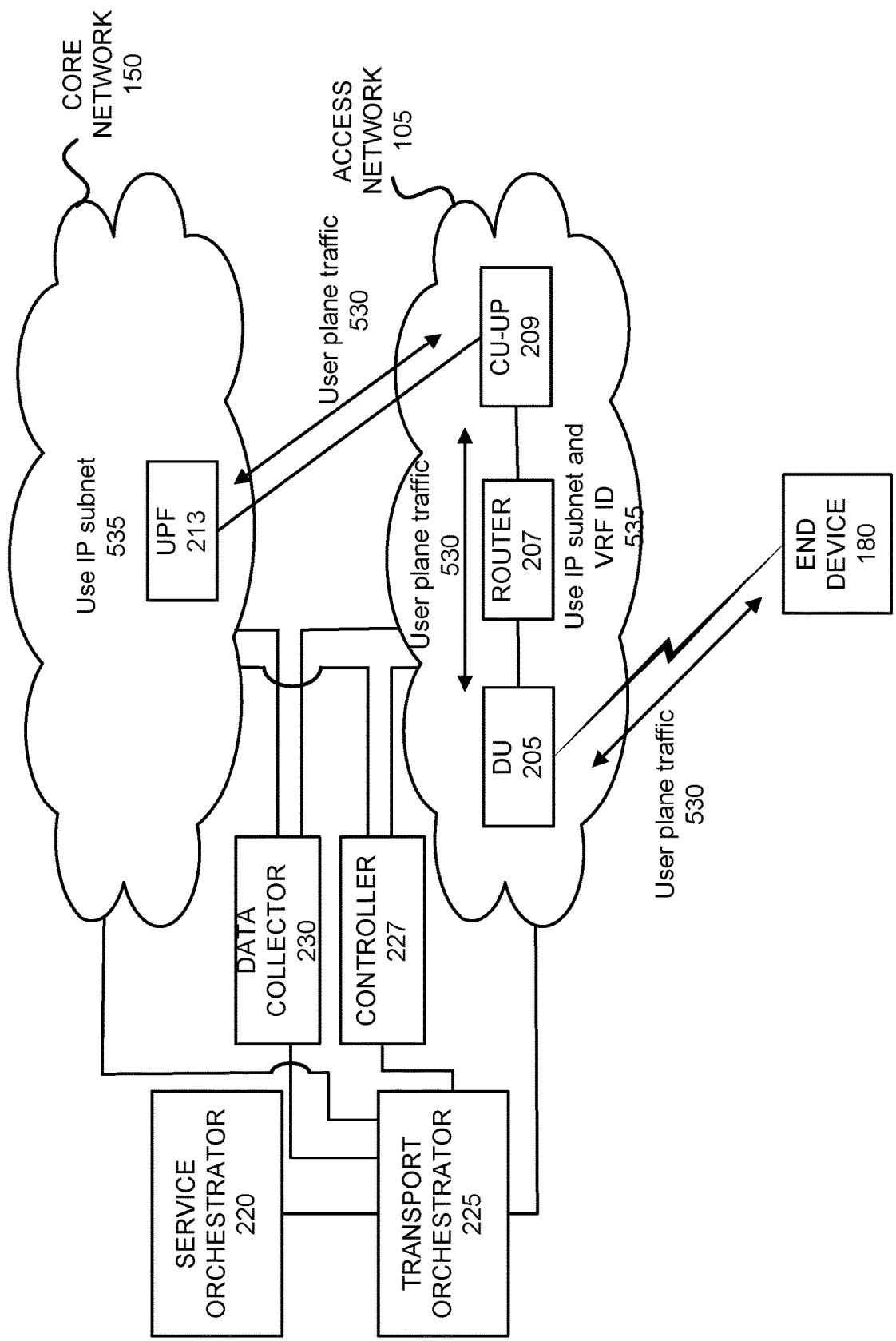

Referring to FIG. 5C, assume that user plane traffic 530 flows across the network slice. Based on the mapping configuration, for example, DU 205, CU-UP 209, and UPF 213 may identify the network slice identifier included in an IP address of the packets of user plane traffic 530, and route and forward the packets based on the correlated IP subnet. Additionally, for example, based on the mapping information, router 207 may identify the IP subnet included in the IP address of the packets of user plane traffic 530, and route and forward the packets based on the VRF identifier and/or the IP subnet identifier.

Figure 5D:
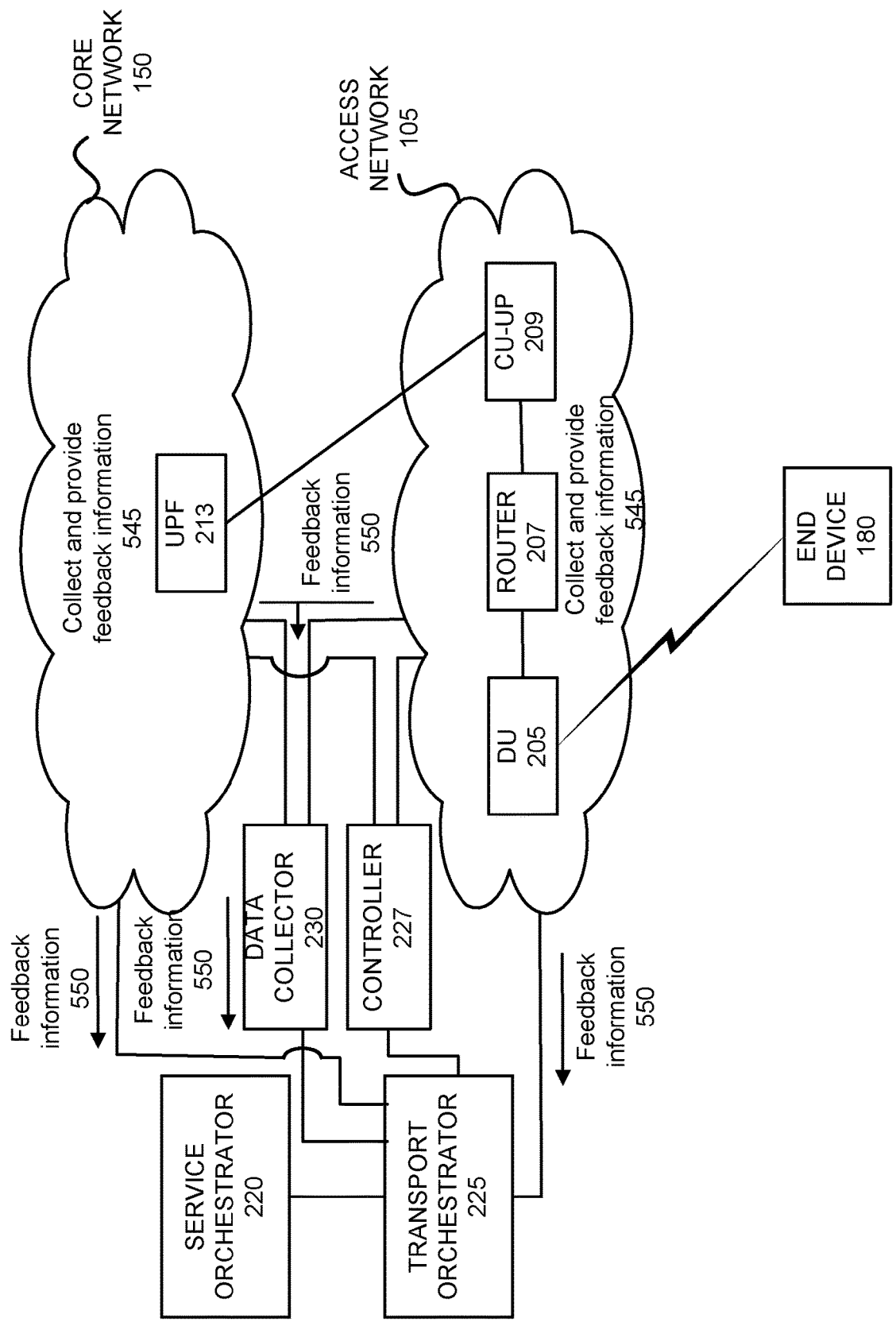

Referring to FIG. 5D, the transport network devices (e.g., DU 205, router 207, CU-UP 209, and UPF 213) may collect and provide feedback information pertaining to the user plane traffic 530. For example, DU 205, CU-UP 209, and UPF 213 may provide performance metric parameters and values relating to packets of the network slice that were received, routed, and forwarded. According to some exemplary implementations, the feedback information may include and be mapped to the network slice identifier. Additionally, for example, router 207 may provide performance metric parameters and values relating to packets of the network slice that were received, routed, and forwarded. According to some exemplary implementations, the feedback information may include and be mapped to the VRF identifier. As illustrated, the feedback information 550 may be transmitted to transport orchestrator device 225 directly or via data collector device 230.

Figure 5E:
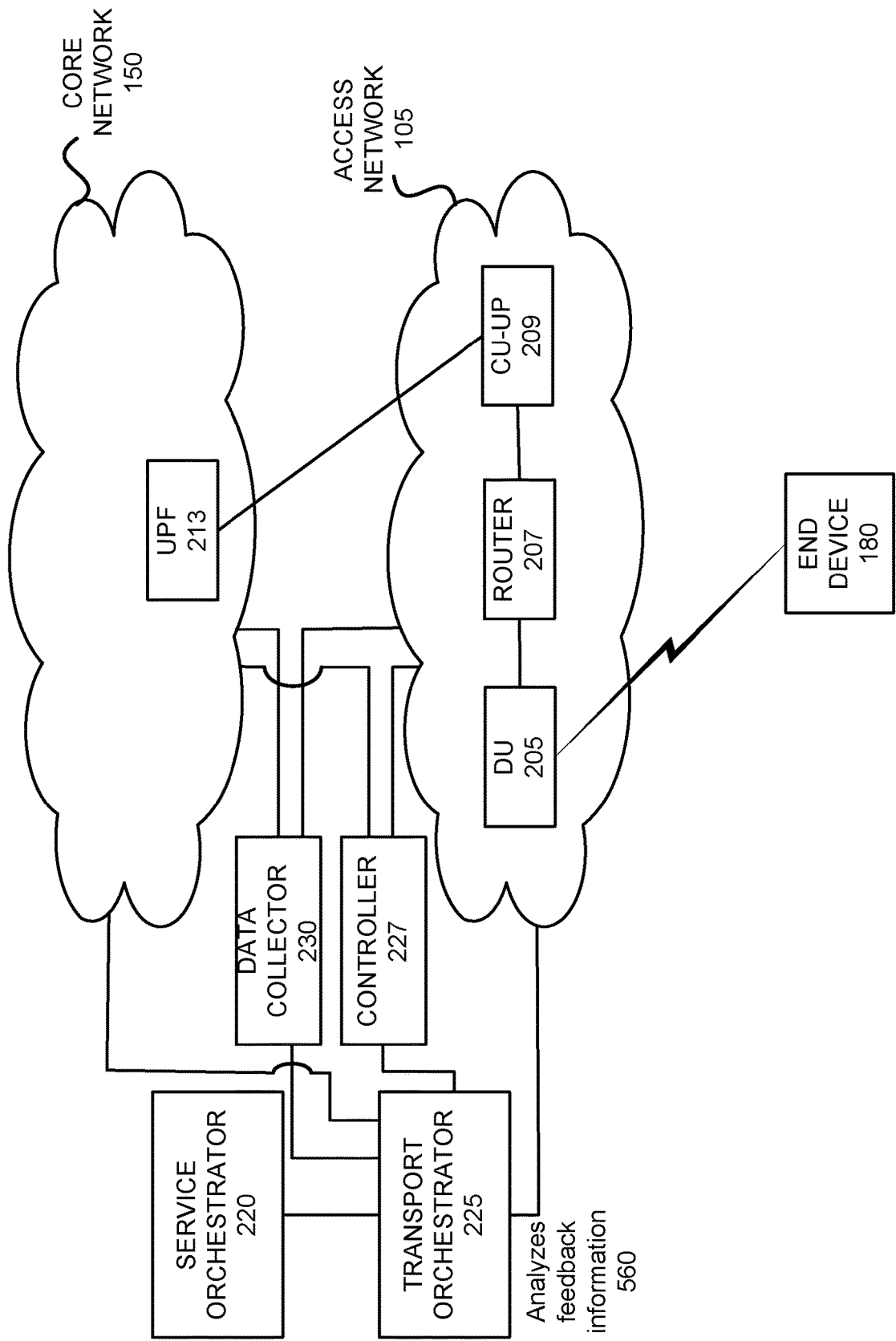

Referring to FIG. 5E, in response to receiving the feedback information, transport orchestrator device 225 may analyze the feedback information pertaining to the network slice. Transport orchestrator device 225 may use the mapping information to correlate the feedback information to the network slice. Depending on the result of the analysis, the result may form a basis for reconfigurations of the network slice or provide confirmation that the network slice is satisfying various network service level requirements. The process of collecting feedback information, providing the feedback information to transport orchestrator device 225, and analyzing the feedback information may be iteratively performed.

Figure 6:
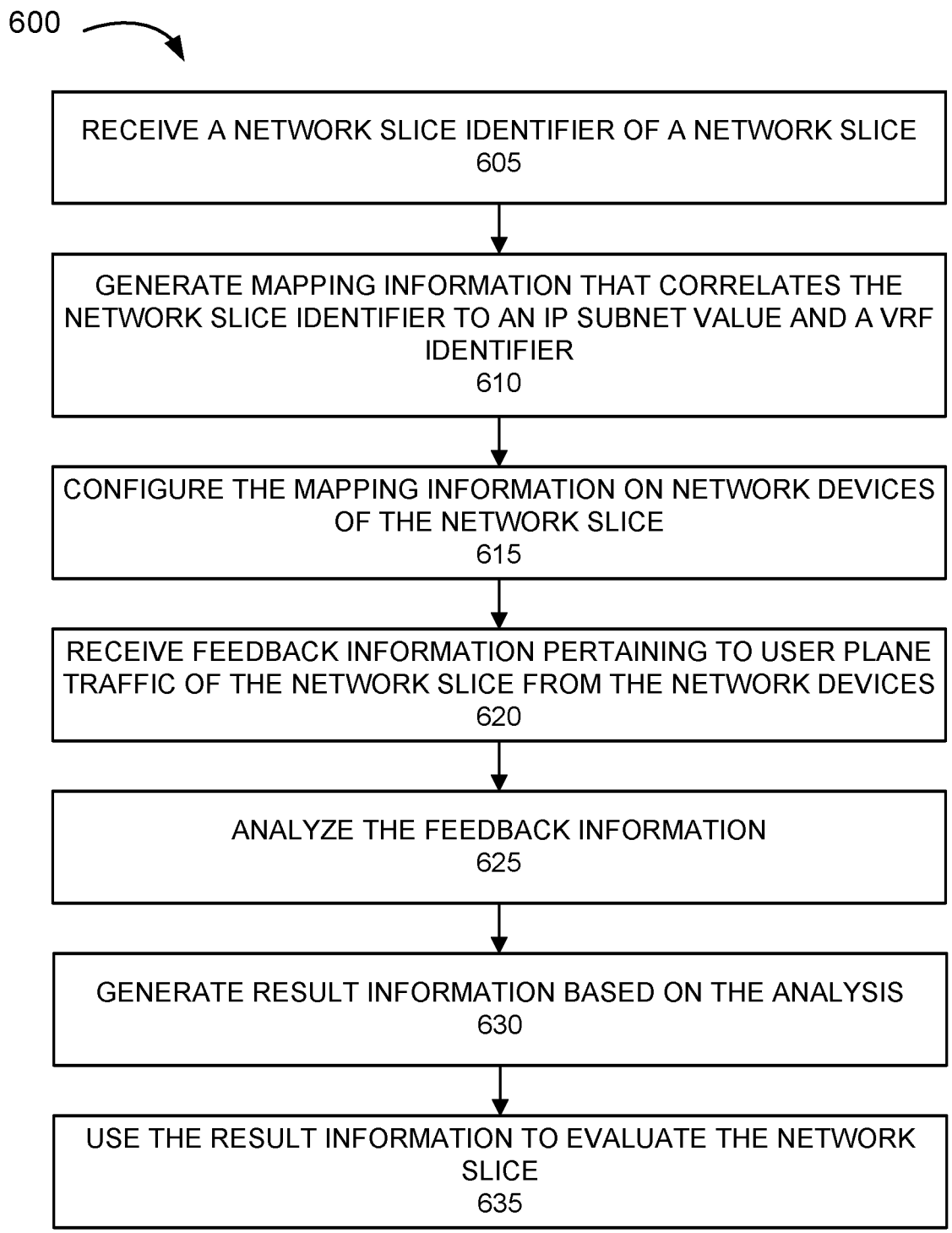
FIG. 6 is a flow diagram illustrating exemplary processes of an exemplary embodiment of the network slice-to-transport domain service.

FIG. 6 is a flow diagram illustrating an exemplary process 600 of an exemplary embodiment of the network slice-to-transport domain service. According to an exemplary embodiment, a network device performs steps of process 600. For example, the network device may be transport orchestrator device 225. Additionally, for example, processor 410 may execute software 420 to perform a step illustrated in FIG. 6 and described herein. Additionally, or alternatively, a step illustrated in FIG. 6 may be performed by execution of only hardware.

In block 605, a network slice identifier, which identifies a network slice, may be received. For example, transport orchestrator device 225 may receive the network slice identifier of the network slice from service orchestrator device 220. According to some exemplary embodiments, the network slice identifier may be an S-NSSAI identifier. As previously described, the network slice identifier may be included or embedded in an IP address used in packets of a traffic flow associated with an application service that traverse the network slice.

In block 610, mapping information may be generated. For example, transport orchestrator device 225 may select and assign an IP subnet identifier and VRF identifier to be mapped to the received network slice identifier. For example, as previously described, transport orchestrator device 225 may query VRF inventory 320 and IP subnet inventory 330 for the selection and assignment procedure. Transport orchestrator device 225 may store the mapping information that correlates at least the network slice identifier, the VRF identifier, and the IP subnet identifier.

In block 615, the mapping information may be configured on the network devices of the network slice. For example, transport orchestrator device 225 may transmit configuration information, which includes the mapping information, to and/or configure a network device of the network slice. Alternatively, transport orchestrator device 225 may transmit the configuration information to an intermediary network device (e.g., controller device 227) via which the configuration information may be transmitted to or configured on the network device of the network slice. According to some exemplary embodiments, depending on the type of network device, the configuration information may include the network slice identifier, the VRF identifier, and/or the IP subnet identifier.

In block 620, feedback information pertaining to user plane traffic of the network slice may be received from the network devices. For example, transport orchestrator device 225 may receive feedback information from the network device or an intermediary network device (e.g., data collector 230). The feedback information may include performance metric parameters and values relating to quality of service, SLA requirements, and/or other performance-based criteria. The feedback information may include at least one of the network slice identifier, the VRF identifier, or the IP subnet identifier.

In block 625, the feedback information may be analyzed. For example, transport orchestrator device 225 may compare performance metric parameters and values included in the feedback information to threshold network performance values that may pertain to the network slice and/or an application service to which the network slice supports.

In block 630, result information may be generated based on the analysis of the feedback information. For example, transport orchestrator device 225 may generate result information based on the analysis of the feedback information. For example, the result information may indicate whether a threshold parameter and value has been satisfied based on the analysis.

In block 635, the result information may be used to evaluate the network slice. For example, transport orchestrator device 225 may evaluate the result information to determine whether the network slice is satisfying various network service level requirements or not. For example, transport orchestrator device 225 may inform service orchestrator device 220 that the network slice may need to be reconfigured when the network slice is not satisfying the network service level requirements, or store the result information when the network slice is satisfying the network service level requirements.

FIG. 6 illustrates an exemplary process 600 of the network slice-to-transport domain service, however, according to other embodiments, process 600 may include additional operations, fewer operations, and/or different operations than those illustrated in FIG. 6, and described herein. For example, process 600 may omit blocks 620 through 635 or a portion of operations thereof. As previously described, some of the operations illustrated and described may be performed iteratively. Additionally, for example, process 600 may be performed in an automated manner. Also, according to some exemplary embodiments, transport orchestrator device 225 may determine whether to invoke the network slice-to-transport domain service based on the network slice identifier. For example, transport orchestrator device 225 may determine, based on the network slice identifier, whether any network devices provisioned for the network slice include a router, a switch, or other layer 3 network device. When it is determined that the network devices do not include a router, a switch, or other layer 3 network device, transport orchestrator device 225 may not invoke the network slice-to-transport domain service. For example, the network devices may use the network slice identifier as a basis for routing, forwarding, etc. of packets, collecting feedback information pertaining to the network slice identifier, etc. However, when transport orchestrator device 225 determines that the network devices do include a router, a switch, or other layer 3 network device, transport orchestrator device 225 may invoke the network slice-to-transport domain service, and provide the service, as described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, the network slice-to-transport domain service may include operations performed manually via an Operations Administration Management (OAM) system. For example, network devices of a network slice may be configured based on a manual configuration.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single or multiple physical memory or storage devices that reside(s) in or is accessible to one or multiple devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device, a network slice identifier that identifies a network slice;
selecting, by the network device in response to the receiving, an Internet Protocol subnet identifier that identifies an Internet Protocol subnet to be used in the network slice and a virtual routing and forwarding identifier that identifies a virtual routing and forwarding instance;
generating, by the network device in response to the selecting, mapping information that correlates the network slice identifier, the Internet Protocol subnet identifier, and the virtual routing and forwarding identifier; and
configuring, by the network device, network devices of the network slice with configuration information that includes at least a portion of the mapping information.

2. The method of claim 1, further comprising:
receiving, by the network device from the network devices subsequent to traversal of user plane traffic via the network slice, feedback information that includes performance metric information pertaining to the user plane traffic; and
evaluating, by the network device, the feedback information based on threshold network performance values.

3. The method of claim 2, wherein the feedback information includes the virtual routing and forwarding identifier, and the method further comprising:
using, by the network device, for one or more instances of the feedback information from one or more of the network devices, the virtual routing and forwarding identifier as a basis to correlate the one or more instances of the feedback information to the network slice identifier.

4. The method of claim 1, wherein the network slice identifier is a Single Network Slice Selection Assistance Information (S-NSSAI) identifier, and the S-NSSAI identifier is embedded in an Internet Protocol version 6 address of the network slice.

5. The method of claim 1, wherein the network devices belong to the Internet Protocol subnet.

6. The method of claim 1, wherein the network slice pertains to at least one of a radio access network, a core network, or an application service layer network.

7. The method of claim 1, wherein the network devices include at least one of a router or a switch, and wherein the method further comprising:

determining, by the network device in response to the receiving, whether the network slice includes the at least one of the router or the switch.

8. The method of claim 1, further comprising:
storing, by the network device, an inventory of virtual routing and forwarding instances pertaining to a network and the network slice; and
storing, by the network device, an inventory of Internet Protocol subnets pertaining to the network and the network slice.

9. A network device comprising:
a communication interface;
a memory, wherein the memory stores instructions; and
a processor, wherein the processor executes the instructions to:
receive, via the communication interface, a network slice identifier that identifies a network slice;
select, in response to the receipt of the network slice identifier, an Internet Protocol subnet identifier that identifies an Internet Protocol subnet to be used in the network slice and a virtual routing and forwarding identifier that identifies a virtual routing and forwarding instance;
generate, in response to the selection of the Internet Protocol subnet identifier, mapping information that correlates the network slice identifier, the Internet Protocol subnet identifier, and the virtual routing and forwarding identifier; and
configure network devices of the network slice with configuration information that includes at least a portion of the mapping information.

10. The network device of claim 9, wherein the processor further executes the instructions to:
receive, via the communication interface, from the network devices subsequent to traversal of user plane traffic via the network slice, feedback information that includes performance metric information pertaining to the user plane traffic; and
evaluate the feedback information based on threshold network performance values.

11. The network device of claim 10, wherein the feedback information includes the virtual routing and forwarding identifier, and the processor further executes the instructions to:
use, for one or more instances of the feedback information from one or more of the network devices, the virtual routing and forwarding identifier as a basis to correlate the one or more instances of the feedback information to the network slice identifier.

12. The network device of claim 9, wherein the network slice identifier is a Single Network Slice Selection Assistance Information (S-NSSAI) identifier, and the S-NSSAI identifier is embedded in an Internet Protocol version 6 address of the network slice.

13. The network device of claim 9, wherein the network devices belong to the Internet Protocol subnet.

14. The network device of claim 9, wherein the network devices include at least one of a router or a switch, wherein the processor further execute the instructions to:
determine, in response to the receipt of the network slice identifier, whether the network slice includes the at least one of the router or the switch.

15. The network device of claim 9, wherein the processor further executes the instructions to:
store an inventory of virtual routing and forwarding instances pertaining to a network and the network slice; and
store an inventory of Internet Protocol subnets pertaining to the network and the network slice.

16. The network device of claim 9, wherein the network slice pertains to at least one of a radio access network, a core network, or an application service layer network.

17. A non-transitory computer-readable storage medium storing instructions executable by a processor of a network device, which when executed cause the network device to:
receive a network slice identifier that identifies a network slice;
select, in response to the receipt, an Internet Protocol subnet identifier that identifies an Internet Protocol subnet to be used in the network slice and a virtual routing and forwarding identifier that identifies a virtual routing and forwarding instance;
generate, in response to the selection, mapping information that correlates the network slice identifier, the Internet Protocol subnet identifier, and the virtual routing and forwarding identifier; and
configure network devices of the network slice with configuration information that includes at least a portion of the mapping information.

18. The non-transitory computer-readable storage medium of claim 17, wherein the instructions further comprise instructions, which when executed cause the network device to:
receive from the network devices subsequent to traversal of user plane traffic via the network slice, feedback information that includes performance metric information pertaining to the user plane traffic; and
evaluate the feedback information based on threshold network performance values.

19. The non-transitory computer-readable storage medium of claim 18, wherein the feedback information includes the virtual routing and forwarding identifier, and wherein the instructions further comprise instructions, which when executed cause the network device to:
use, for one or more instances of the feedback information from one or more of the network devices, the virtual routing and forwarding identifier as a basis to correlate the one or more instances of the feedback information to the network slice identifier.

20. The non-transitory computer-readable storage medium of claim 17, wherein the network devices belong to the Internet Protocol subnet, and wherein the network devices include at least one of a router or a switch.

* * * * *